April 20, 1937.  C. HABERSTROH  2,078,074
CLOTHESLINE PULLEY
Filed Feb. 8, 1936
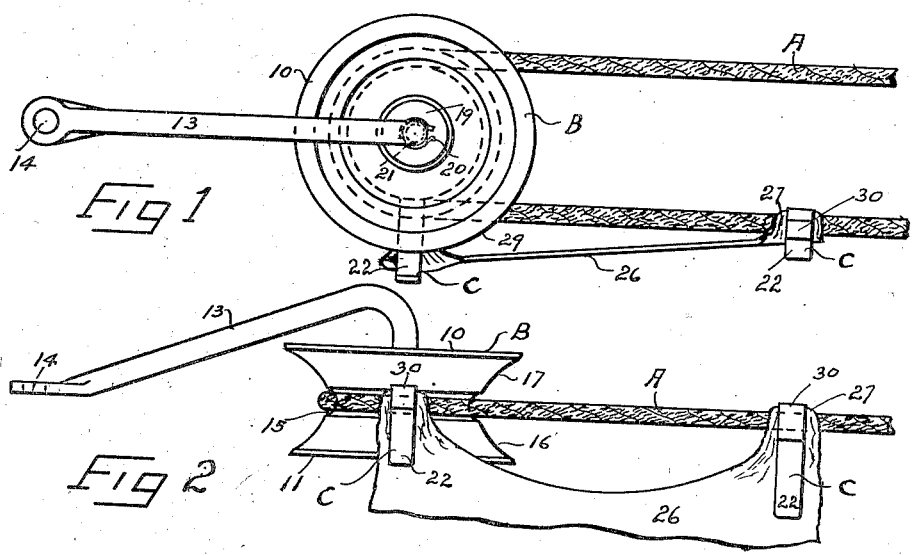
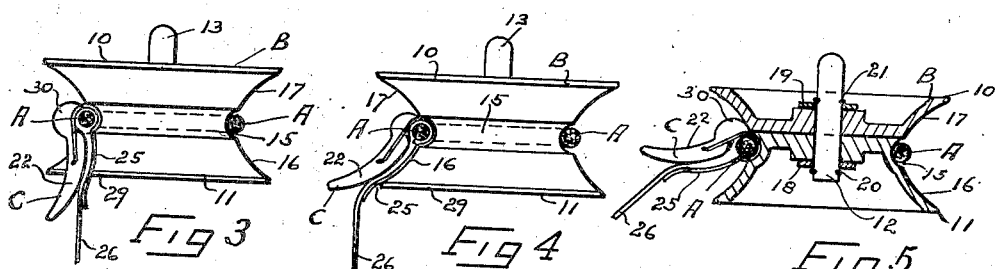
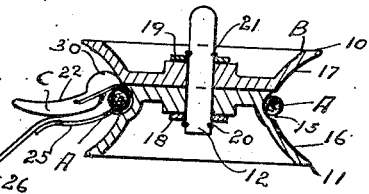
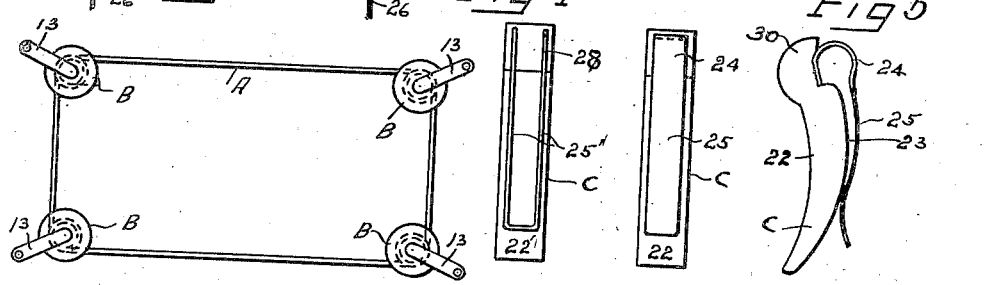
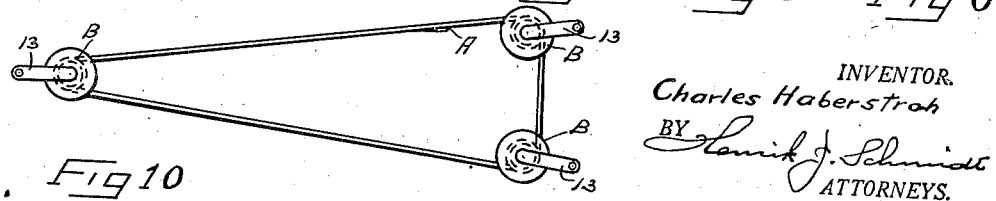
INVENTOR.
Charles Haberstroh
BY
ATTORNEYS.

Patented Apr. 20, 1937

2,078,074

UNITED STATES PATENT OFFICE 2,078,074

CLOTHESLINE PULLEY

Charles Haberstroh, New Rochelle, N. Y.

Application February 8, 1936, Serial No. 62,931

2 Claims. (Cl. 254—190)

The invention relates to clothes-line pulleys of the type in which the pulleys are placed horizontally, and it has as its object to provide a combination of pulleys, clips and line which has many advantages over the ordinary pulley lines now in use. One of the main objects of the invention is to provide a series of pulleys on which a line can be conveyed in such a manner that the laundry may be placed on the whole length of the line and in which the clips employed for supporting the laundry will freely pass over the pulleys.

Another object is to so construct the pulleys and the clips that the laundry cannot come in contact with, nor be tangled up in the pulleys. A further object is to so construct the clips and the pulleys that, even when the articles of laundry are violently blown by the wind, the clips will be righted by the pulleys as they pass around them. Additional objects are to provide a device of simple construction, which is easy to install and manipulate, which will readily conform to whatever space it may be installed in, and which can be manufactured and sold at a comparatively low price.

These and various other objects and advantages will be readily understood from the following description and from the accompanying drawing of a preferred embodiment of the invention, in which, however, modifications may be made without departing from the scope of the appended claims. In the drawing Fig. 1 is a plan view of the invention;

Fig. 2 is a side view;

Figs. 3 and 4 are side elevations of one of the pulleys and one of the clips used, showing the action of the pulley on the clip;

Fig. 5 is a similar, but sectional view;

Fig. 6 is a side view of one of the clips;

Figs. 7 and 8 are front views of clips of slightly modified constructions; and

Figs. 9 and 10 are diagrams illustrating the manner in which the pulleys may be mounted.

Referring now to all the views, simultaneously, the line is indicated at A, the pulleys at B and the clips at C. The pulley line may be of any ordinary type. Each of the pulleys is preferably made of an upper part 10 and a lower part 11, which parts are free to rotate on a downwardly extending member 12, formed on the end of a rod 13. The other end of this rod is provided with an eye 14 by means of which the rod may be secured to any convenient object. The lower part 11 of the pulley is provided with a groove 15 in which the line A is supported. It is also provided with a downwardly and outwardly curved face 16. The upper part 10 is provided with a similar curved face 17. These parts are mounted on the member 12 between washers 18 and 19 and the washers, as well as the parts, are preferably held on the member between spring clips 20 which engages in grooves 21 formed in the member. The members 10 and 11 may be made from pressed metal or moulded, however, I prefer to make them of glass.

The clip consists of a body member 22 which is provided with a curved face 23 and in which a spring member 24 is secured in any suitable manner. This spring member is provided with a curve 25 which fits the curved face 16 in the pulley. The laundry 26 is clamped between the spring 24 and the face 23 and may or may not be turned over the clothes line, as shown at 27, depending on the nature and weight of the clothes or articles being dried. The spring member 24 may be made either of a flat piece of spring metal, as shown in Figs. 6 and 8, or of a spring wire 28 as shown in Fig. 7.

The device is operated in the following manner. The clothes are secured to the line by the necessary number of clips. Two pulleys may be used as indicated in Figs. 1 or 2, or 3 or 4 pulleys may be mounted in the manner plainly indicated in Figs. 9 and 10. As the line is turned on the pulleys, the clips will encounter the edge 29 of the pulley, as plainly indicated in Fig. 3, and this edge will cause the clip to be forced up on the face 16, as plainly shown in Fig. 4. Thus the piece of laundry will be carried clear off the pulley, as also plainly shown in Fig. 4.

The body member of the clip is also provided with a curved projection 30 at its upper end. It often happens that the laundry is blown so that the clips are turned on the line. In such a case, the clips as they strike the curved face 17 of the upper part of the pulley will likewise be righted, as shown at Fig. 5, where the clip is shown being forced down to its normal position. As the pulley is made in two parts, the upper part need not turn except when the clips engage it, as in the case above stated. This feature makes it much easier to pull the line around the pulley.

While I have described and illustrated the device as used as a clothes line, it is evident that it might find other uses. I do not therefore wish to limit it to any particular use but intend to use it whenever it may be found advantageous.

Having described the invention and its objects, what I claim as new and wish to protect by Letters Patent is:—

1. A pulley for supporting a clothespin line comprising an upper and lower part; a support for the pulley; each of said parts being adjacent and independently rotatable on said support, the lower part of the pulley provided with a groove for supporting the line and with an outwardly and downwardly curved face for engagement with the pins secured on the line to enable these pins to pass around the pulley without fouling any articles suspended in the pins; and the upper part of the pulley provided with an outwardly and upwardly curved face for restoring any of such pins to their normal position on the line if distorted from such normal position.

2. A pulley for supporting a clothespin line comprising an upper and lower part; a support for the pulley; each of said parts being independently rotatable on said support; the pulley provided with means for supporting the line and having an outwardly and downwardly curved face for engagement with the pins secured on the line to enable these pins to pass around the pulley without fouling any articles suspended in the pins; and the upper part of the pulley provided with an outwardly and upwardly curved face for restoring any of such pins to their normal position on the line if distorted from such normal position.

CHARLES HABERSTROH.